Patented Nov. 2, 1948

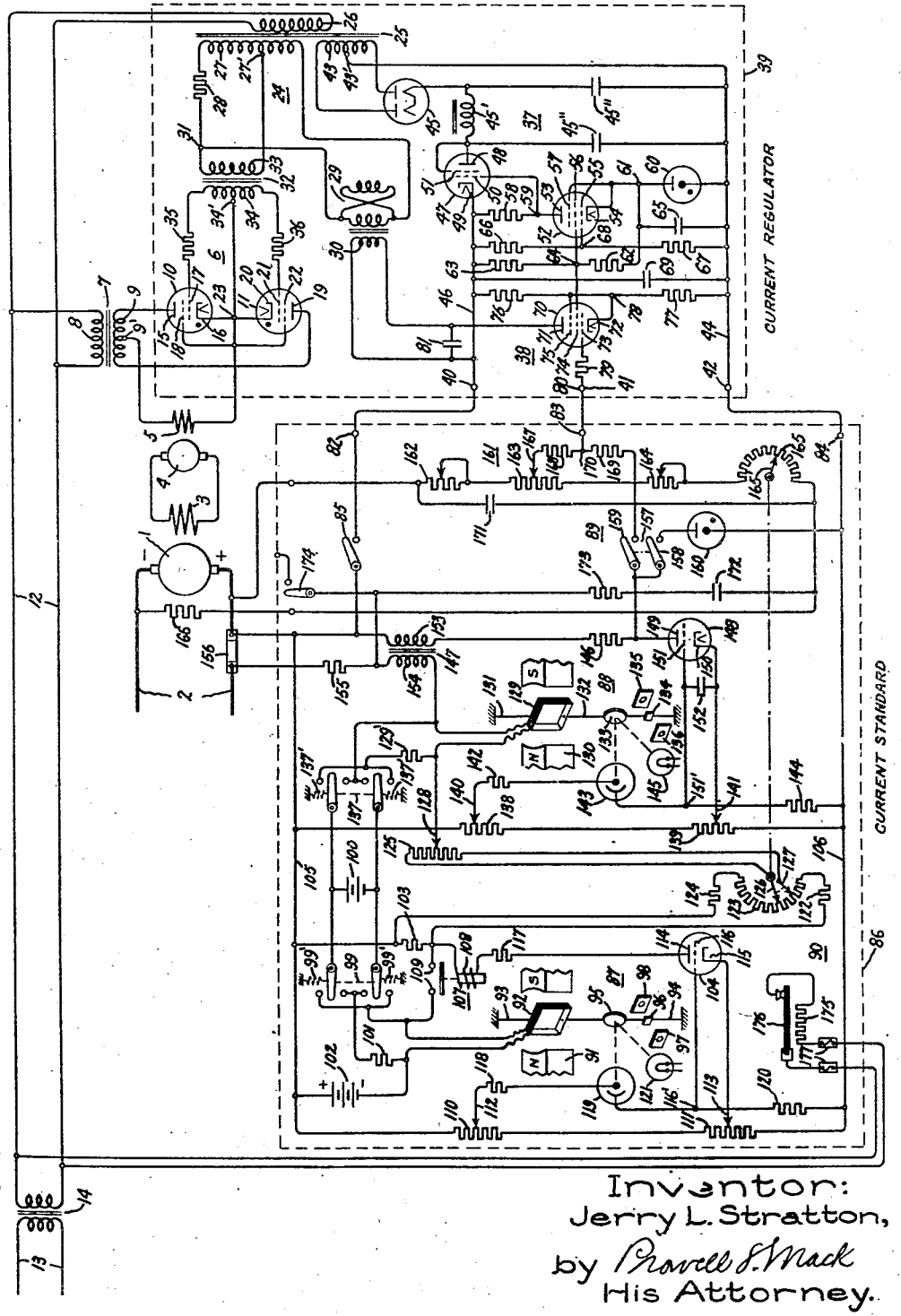

2,452,611

UNITED STATES PATENT OFFICE 2,452,611

ELECTRIC REGULATOR

Jerry L. Stratton, Schenectady, N. Y., assignor to General Electric Company, a corporation of New York Application March 21, 1946, Serial No. 655,981

11 Claims. (Cl. 322—36)

1

My invention relates to an electric regulator and more particularly to an electric regulator of the electronic type for controlling an electrical condition, such as the voltage or current of an electric circuit or of a dynamo-electric machine.

It is an object of my invention to provide a new and improved electric regulator.

It is another object of my invention to provide a new and improved electronic regulator and regulating system for controlling the voltage or the current of an electric circuit or of a dynamo-electric machine.

It is still another object of my invention to provide a new and improved electronic regulating system for controlling the voltage of a generator and for maintaining its load current constant.

Although my invention may be utilized in various types of circuits for controlling either the voltage or the current of such circuits, I have found it to be particularly well adapted for controlling the voltage and current of a direct current generator provided with a separately excited field winding and an exciter therefore having a separately excited field winding controlled by a controlled electronic network. In accordance with the illustrated embodiment of my invention, I provide an electronic regulator which controls the generator voltage but the voltage so held is modified by a current standard in such a way as to produce a constant load current regardless of variations in the load resistance of the generator.

My invention will be better understood from the following description taken in connection with the accompanying drawing, and its scope will be pointed out in the appended claims.

The single figure of the accompanying drawing is a diagrammatic illustration of one embodiment of my invention arranged for controlling a direct current generator.

Referring to the drawing, I have shown an embodiment of my invention for controlling the voltage or current of a direct current generator 1 provided with an armature output circuit 2 and a field winding 3. The field winding 3 is illustrated as being energized by an exciter 4 which, in turn, is provided with a separately excited field winding 5, although the excitation of the generator 1, if desired, may be obtained directly rather than through the controlled exciter. As illustrated, the field winding 5 of exciter 4 is arranged to be energized from a controlled rectifier 6 which comprises a transformer 7 having a primary winding 8 and a secondary winding 9 connected through a pair of electronic tubes 10 and 11 which are arranged for bi-phase half-wave rectification. The

2 primary winding 8 of the rectifier transformer 7 is connected to be energized from an alternating current supply bus 12 which, in turn, is connected to be energized from a main alternating current supply circuit 13, preferably through a constant voltage transformer 14, to insure a substantially constant voltage for energizing the various component circuits of the regulator. The electronic tubes 10 and 11 are preferably of the gaseous type, such as of the thyratron type as illustrated, and each tube is provided with a control electrode to control the desired current for excitation of the exciter field winding 5. Tube 10 is provided with an anode 15, a cathode 16, a control grid 17 and a suppressor grid 18, while tube 11 is similarly provided with an anode 19, a cathode 20, a control grid 21 and a suppressor grid 22. The suppressor grids 18 and 22 are connected to their respective cathodes in a conventional manner. One terminal of field winding 5 is connected to a midpoint 9' of the secondary winding 9 and the other terminal of field winding 5 is connected to a junction point 23 of the cathodes 16 and 20 also in a conventional manner for bi-phase rectification. The heater circuits for cathodes 16 and 20 have been omitted to avoid complicating the drawing but such heater circuits would be provided for these tubes as well as for the other tubes with heater circuits later described in any conventional manner well known in the art. The control grids 17 and 21 are connected to be controlled through a suitable phase shifting means or network 24 which, as illustrated, comprises a transformer 25 having a primary winding 26 connected to be energized from the alternating current supply bus 12, and a secondary winding 27 provided with an electrical mid-point terminal 27'. A resistor 28 and a saturable reactor 29 provided with a direct current saturating winding 30 are connected in series relation across the end terminals of the secondary winding 27. A junction terminal 31 is is provided between the resistor 28 and the saturable reactor 29. A grid transformer 32 is provided to obtain a voltage from phase shift circuit 24 which is variable in phase with respect to the voltage impressed upon the anode-cathode circuits of tubes 10 and 11. The grid transformer 32 comprises a primary winding 33 connected between the electrical midpoint 27' and the junction terminal 31, and a secondary winding 34 having a midpoint 34' connected to the cathode junction terminal 23 with the end terminals thereof connected through grid resistors 35 and 36 to grids 17 and 21, respectively.

The regulator which controls the energization of generator 1 by controlling the rectifier 6 comprises a voltage standard section 37 and an amplifier section 38. These two sections along with the rectifier 6 and its phase shift circuit 24 may be conveniently mounted on the same panel for unit enclosure as indicated by the dotted rectangle 39. This unit assembly, for ease of identification, will be referred to as a "current regulator" and is provided with output terminals 40, 41 and 42. Power supply for the voltage standard 37 may be obtained, as illustrated, from an additional secondary winding 43 on the transformer 25. Secondary winding 43 is provided with a center-tap 43' which is connected to a negative bus conductor 44 of the regulator, while the end terminals of transformer 43 are connected through a double-anode rectifier tube 45 to a positive bus conductor 46 so as to provide a rectified direct voltage between conductors 44 and 46. Negative bus conductor 44 is connected to output terminal 42 and positive bus conductor 46 is connected to output terminal 40. Constant voltage between the output terminals 40 and 42 is obtained by means of an electronic tube 47 having an anode 48, a cathode 49, a control grid 50 and a suppressor grid 51. The tube 47 is preferably of the high vacuum type and is connected in series relation with bus conductor 46 to serve as a series variable impedance to maintain the voltage across terminals 40 and 42 at a constant value. The output of the rectifier 45 is preferably filtered by suitable filter means which may comprise a series inductance 45' connected in bus conductor 46 and a pair of capacitors 45'' connected on each side of the inductance 45' in parallel relation across the rectifier output terminals. The series impedance regulating tube 47 is controlled by an amplifying tube 52 by direct coupling. Tube 52 is preferably a pentode tube of the high vacuum type and is provided with an anode 53, a cathode 54, a control grid 55, a screen grid 56 and a suppressor grid 57. Tube 52 is connected in series relation with a resistor 58 connected between the tube anode 53 at a junction terminal 59 and the positive conductor 46, and a voltage regulating tube 60 of the glow discharge type connected between the cathode 54 at a junction terminal 61 and the negative conductor 44. The junction terminal 59 is connected to the grid 50 of the series regulating tube so that the resistor 58 is connected in the control grid-cathode circuit of tube 47. The voltage regulating tube 60 maintains the cathode of amplifier tube 52 at a potential fixed relative to the negative bus 44. The tube 60 is connected to the positive bus conductor 46 through a pair of series connected resistors 62 and 63. A junction terminal 64 is provided between the resistors 62 and 63 and is connected to the screen grid 56 of tube 52 so that the screen grid is maintained at a position potential relative to its cathode 54. The suppressor grid 56 is connected to its cathode in a conventional manner. A capacitor 65 is connected in parallel with glow tube 60 to act as a bypass and filter. A voltage divider comprising series connected resistors 66 and 67 having a junction terminal 68 therebetween is connected across the regulated bus conductors 44 and 46. The junction terminal 68 is connected to control grid 55 of amplifier tube 52 and thereby impresses upon the control grid 55 any voltage deviation from the standard established by glow tube 60. A capacitor 69 is connected in parallel with the voltage divider across conductors 44 and 46 to suppress residual voltage ripple of the output voltage across conductors 44 and 46 of the voltage standard.

The control of the rectifier 6, as previously stated, is effected by means of the phase shift circuit 24 and, as illustrated, by varying the saturation of reactor 29 by means of its direct current winding 30. The energization of winding 30 is obtained by connecting this winding across the voltage standard conductors 44 and 46 through a controlled electronic tube 70. Although any suitable type of tube may be used, I have illustrated tube 70 as being of the high vacuum type with an anode 71, a cathode 72, a control grid 73, a screen grid 74, and a suppressor grid 75. A voltage divider comprising series connected resistors 76 and 77 and having a junction terminal 78 therebetween is connected across the voltage standard bus conductors 44 and 46. The cathode 72 of tube 70 is connected to the junction terminal 78 to maintain the cathode of tube 70 at some predetermined voltage negative with respect to the positive bus conductor 46. The screen grid 74 of tube 70 is connected to the junction terminal 64 between voltage divider resistors 62 and 63 while the suppressor grid 75 is connected to its cathode 72 in a conventional manner. The control grid 73 is connected through a grid resistor 79 to a third terminal 80 of the current regulator assembly 39 for connection to the voltage of the generator 1 in a manner to be described presently. A bypass capacitor 81 is connected across the saturating coil 30.

A portion of the voltage of generator 1 to be regulated is applied between the regulator terminals 40 and 80 and in the form illustrated these terminals are connected to output terminals 82 and 83, respectively, of the section of the regulator identified as the "current standard." A third output terminal 84 of the current standard is connected to terminal 42 of the current regulator and forms the negative bus of the regulated anode supply for the current standard. The terminal 40 is maintained at a positive potential with respect to terminal 41 and is connected through terminal 82 and a switch 85 to the positive side of output circuit 2 of generator 1 and also supplies a positive potential to the anode of the control tubes of the current standard.

The "current standard" above referred to comprises an electronic control network preferably encased in a constant temperature box or compartment indicated by the dotted rectangle 86. The current standard may be divided into four circuits which may be identified as a "reference fluxmeter" 87, a "monitor fluxmeter" 88, a "feedback circuit" 89 and a compartment heater circuit 90. The particular arrangement of the elements and control circuits of the current standard per se are the invention of Theodore A. Rich and are described and claimed in his copending application Serial No. 655,982 filed concurrently herewith and assigned to the assignee of the present application. The reference fluxmeter 87 comprises, broadly speaking, a compensated galvanometer of the type described and claimed in Patent No. 2,356,608, granted August 22, 1944 upon an application of Lorin O'Bryan. The term "compensated" as used in connection with this galvanometer means that the meter does not tend to drift either to a zero or to a stop position at either end of its travel. Since the specific details of the fluxmeter per se form no part of my invention, I have illustrated the essential elements of the device in a simplified diagrammatic form as comprising a magnetic core 91 within which is suspended a coil winding 92 by means of wires 93 and 94, which are preferably of gold. A mirror 95 is mounted on the wire 94. The fluxmeter is similar to a direct current milliammeter except that it has no restraining torque and very little friction in view of the gold wire suspension. Whatever restraining torque is introduced by the gold wire suspension is canceled out by a tiny permanent magnet 96 operating in the stray field of the magnet 91. Adjustment of the stray field is obtained by soft iron magnetic field shunting elements 97 and 98 which are adjustable towards or away from the magnet 96. The closer these two soft iron pieces are to the small torque-compensating magnet 96, the less the restraining torque is canceled out, and vice versa. Manual control of the fluxmeter position is obtained by means of a reversing switch 99 which connects the coil 92 for energization of either polarity from a battery 100 through a resistor 101. The switch 99 is biased to a neutral contact position by suitable means indicated as springs 99'. The primary standard in the current standard is a standard cell 102, the voltage of which is compared with the voltage drop across a resistor 103. The resistor 103 and a control tube 104 are connected across bus conductors 105 and 106 which are energized from the regulated voltage supply input terminals 82 and 84 from the current regulator 39. In order to protect the standard cell, a relay 107 is provided and comprises an operating coil 108 connected in series with resistor 103 and control contacts 109. The contacts 109 connect the standard cell 102 in differential relation with the voltage drop of resistor 103 across the coil 92. A voltage divider comprising resistors 110 and 111 is connected in series across the regulated voltage supply conductors 105 and 106. Resistors 110 and 111 are provided with adjustable taps 112 and 113, respectively. The tube 104 is provided with an anode 114, a cathode 115 and a control electrode or grid 116. An anode resistor 117 is connected in series with anode 114, and the cathode 115 is connected to the adjustable tap 113 on resistor 111. A voltage divider comprising in series relation a resistor 118, a light sensitive device such as a phototube 119, and a resistor 120 is connected between the adjustable tap 112 of resistor 110 and to the conductor 106. The grid 116 of tube 104 is connected to a junction terminal 116' between the phototube 119 and the resistor 120. The resistance of the phototube is controlled in accordance with the amount of light striking its target as directed thereon by the mirror 95 of the fluxmeter from a source of light 121 and thereby controls the potential of grid 16.

It may be helpful at this point to consider the operation of the reference fluxmeter 87. By placing the reversing switch 99 in one position or the other, a voltage is impressed on the fluxmeter coil 92 from battery 100 to force coil 92 to rotate in one direction or the other to a given position. The phototube 119 and resistors 118 and 120 form a voltage divider circuit to control the grid 116 of tube 104. As soon as tube 104 is rendered conductive by the initial positioning of coil 82, the relay 108 picks up to close its contacts 109 and thereby connect coil 92 of the fluxmeter for energization in accordance with the differential voltage of the standard cell 102 and the drop across resistor 103. Since the fluxmeter will rotate in one direction as long as voltage of one polarity is impressed across it and in the opposite direction if the voltage is reversed, the fluxmeter will hold the anode current of tube 104 at a value which will produce a voltage across resistor 103 exactly equal to the voltage of standard cell 102. If the anode current of tube 104 starts to drop, the higher voltage of the standard cell will cause the fluxmeter to swing the light beam further on the phototube 119 to increase in a positive direction the potential of grid 116 and thereby increase the current through resistor 103 and establish a state of voltage equilibrium with the voltage of the standard cell. If for any reason, such as failure of the light source 121, the anode current to tube 104 drops below the predetermined value required to give the desired drop across resistor 103, the relay 107 will drop out and open the circuit of standard cell 102. After reestablishing the light source, the light beam will have to be projected on the phototube 119 by means of the manual control switch 99 which may be momentarily operated to an energizing position to actuate the relay coil 108 and establish the desired grid potential on grid 116.

It will have been observed from the foregoing description of the reference fluxmeter 87 that a standard voltage equal to the voltage of the standard cell 102 will be obtained across resistor 103. The standard voltage obtained across resistor 103 will be as standard as that of the standard cell, making it possible to tap off different voltage components having the characteristics of the voltage of the standard cell without drawing any current from the standard cell. This standard voltage drop across resistor 103 is divided into steps by the arrangement of resistors 122, 123, 124 and 125. Resistors 122 and 124, which may be fixed resistors, are connected in series relation with the resistor 123 of the variable type across the voltage standard resistor 103. The resistor 123 is provided with two adjustable arms 126 and 127 adjusted in spaced relation on the resistor 123 and connected, respectively, to the terminals of resistor 125. If desired, the arms 126 and 127 may be tied together mechanically to preserve a given spaced relation between the arms and for operation thereof in unison. The resistor 125 is also provided with an adjustable arm 128.

The monitor fluxmeter 88 may be substantially the same as the reference fluxmeter 87 except that it may be provided with a lower resistance coil 129 cooperating with its magnetic core 130. The coil 129 is suspended by gold wires 131 and 132 and a mirror 133 is mounted on the wire 132. The adjustment for the stray field is obtained by the small magnet 134 and the soft iron pieces 135 and 136 placed in the stray field of the magnet 130. Manual control of the fluxmeter 88 is obtained by means of a reversing switch 137 biased to a neutral contact position by suitable means indicated as springs 137'. The switch 137 controls the monitor fluxmeter coil 129 through a resistor 129' from battery 100 in the same manner as switch 99 controls the reference fluxmeter coil 92; in other words, it initially positions the coil 129 to a desired operating position. A voltage divider, comprising resistors 138 and 139 connected in series relation across conductors 105 and 106 of the regulated voltage supply, is provided for the controlled circuit of the monitor fluxmeter 88. The resistors 138 and 139 are provided, respectively, with adjustable arms 140 and 141. A voltage divider comprising a resistor 142, a phototube 143 and a resistor 144 is connected in series relation between the adjustable arm 140 of resistor 138 and the bus conductor 106. The resistance of the phototube 143 is controlled in accordance with the amount of light striking its target as directed thereon by the mirror 133 by a source of light 145. A control circuit for the monitor fluxmeter comprises a resistor 146 connected in series relation with transformer 147 constituting a mutual inductance and a controlled electronic tube 148 between the regulated bus conductor 105 and the adjustable arm 141 on voltage divider resistor 139. The tube 148 is provided with an anode 149, a cathode 150 and a control electrode or grid 151. The grid 151 is connected to a junction terminal 151' between phototube 143 and resistor 144. A capacitor 152 is connected between the grid 151 and its cathode 150 for preventing the grid from changing its potential too quickly. The transformer 147, or mutual inductance, comprises a primary winding 153 connected in series with the anode-cathode circuit of tube 148 and a secondary winding 154. The secondary winding 154 is connected in series relation with the coil 129 of the monitor fluxmeter and through a resistor 155 to the negative terminal of a current shunt 156 which, in turn, is connected in the positive output conductor 2 of generator 1. The positive terminal of shunt 156 is connected to the positive bus conductor 105 and also to the controlled circuit including the primary winding 153 of the mutual inductance and the controlled tube 148. The monitor fluxmeter thus compares the component of voltage across shunt 156 with the voltage component derived from the secondary standard constituted by the voltage divider resistor 125 and the associated resistors 122, 123 and 124. The comparison circuit may be traced from the positive terminal of shunt 156, conductor 105, resistors 124, 123 and 125 and adjustable arm 128, through coil 129, thence through secondary winding 154 and resistor 155 to the negative terminal of shunt 156. The mutual inductance 147 having its primary winding 153 in series relation with tube 148 slows down any change in energization of the circuit of coil 129 by inducing a voltage therein which tends to rotate the element 129 in such a direction as to oppose the change of current in the circuit of tube 148. A double-poled switch 157 having one set of contacts 158 and another set of contacts 159 is provided to connect a voltage regulating glow tube 160 through contacts 158 to the anode of tube 148 and to the regulated bus conductor 106 and also to connect the glow tube 160 through contact 159 to the terminal 80 of the current regulator through terminal 83.

The "feedback" circuit 89 is utilized to insert a voltage component in the monitor fluxmeter circuit in accordance with voltage changes of generator 1 and comprises a voltage divider 161 connected to be responsive to the voltage of generator 1 and includes in series relation adjustable resistors 162, 163, 164 and 165 connected across the positive and negative terminals of generator 1 through a fixed resistor 166. The resistor 163 is provided with an adjustable arm 167 which is connected through series connected resistors 168 and 169 to the contacts 159 of switch 157. The resistor 165 is also provided with an adjustable arm 165' which may be connected mechanically, as indicated by the dotted line, to operate in unison with arm 126 of resistor 123. A junction terminal 170 is provided between the resistors 168 and 169 which is connected to output terminal 83 of the current standard and thence to terminal 80 of the current regulator so as to maintain the terminal 80 negative with respect to its associated terminal 40. A capacitor 171 is connected across the voltage divider 161 and with resistor 166 forms a filter to reduce the voltage ripple on the voltage divider 161. Energy storage means such as a capacitor 172 is charged through resistor 166 from the negative generator terminal in a circuit including resistor 173, resistor 155 in the circuit of fluxmeter coil 129 to the negative side of shunt 156 in the positive conductor of generator 1. The capacitor 172 and its associated circuit elements constitutes an anti-hunting circuit and is arranged to charge or discharge when the voltage of generator 1 changes through the resistor 155 and thereby insert a component of voltage in the circuit of coil 129 of the monitor fluxmeter. Since capacitor 172 may hold its charge upon removal of the current standard panel for inspection or repair, it is desirable to short circuit this capacitor as indicated by the grounding switch 174.

The heater circuit 90 is provided to maintain the temperature of the current standard compartment 86 at a constant temperature and, as illustrated, this heater circuit comprises a heater element 175 preferably positioned near the bottom of the compartment with thermostat 176 and suitable fuse elements 177 all connected in series relation to be energized from the alternating current supply circuit 12.

The operation of the current regulator is substantially as follows: The current regulator itself controls generator voltage when switch 157 is open and switch 85 is closed (both in the current standard). Constant voltage is maintained between the current regulator terminals 40 and 42 by the action of series regulating tube 47 which in effect is a variable impedance between the output terminals 40 and 42 and the supply voltage of transformer 25. Grid control for tube 47 is obtained in accordance with the voltage drop across resistor 58 and this voltage, in turn, is dependent upon the grid-to-cathode voltage of amplifier tube 52, as determined by the differential voltage between the component of voltage across resistor 67 and the fixed component of voltage established by glow tube 60. Let it be assumed that the voltage of the power supply conductors 44 and 46 tends to increase. This causes an increased voltage drop across resistor 67, increases the positive potential of grid 55 of tube 52 and thereby increases its anode current. The increase in anode current of tube 52 increases the current in resistor 58 and thereby makes the grid of the series regulating tube more negative so as to bring the reference voltage across conductors 44 and 46 back to normal. A standard voltage of reference is thus provided between the terminals 40 and 42. The voltage divider 161 is connected across the terminals of generator 1 and a voltage proportional to the voltage of generator 1 is introduced into the current regulator between terminals 40 and 41 and compared with the reference voltage. The portion of the voltage obtained from generator 1 is applied to the terminals 40 and 41 in such a way as to make terminal 41 negative with respect to terminal 40. Terminal 41 is connected to the grid of amplifier tube 70. Now assume that the voltage of generator 1 rises. As a result, the voltage between terminals 40 and 41 increases and causes the grid 73 of tube 70 to become more negative, thereby decreasing the anode current of tube 70. This anode current is the direct current saturating current of saturable reactor 29 and the decreased saturation increases the reactance and thereby increases the angle of lag of the grid voltage of rectifier 6. This results in a reduced current output from the tubes 10 and 11 which, in turn, reduces the generator excitation so that the generator voltage drops back to normal.

The foregoing description of the generator has been with reference to the regulator as a voltage control device. When used with the current standard with switch 157 closed, the regulating system becomes a current regulating device. This is accomplished by the action of the current standard in comparing a component of voltage from the current shunt 156 and a component of voltage derived from the standard voltage obtained from resistor 125 and its associated voltage divider resistors. The difference voltage thus obtained is amplified to modify the generator voltage introduced between the current regulator terminals 40 and 41. When switch 157 is closed, terminal 83 of the standard which is connected through terminal 41 to the grid of amplifier tube 70 assumes the average voltage of the tap 167 on resistor 163 and the anode voltage of tube 148. This average voltage varies in accordance with the operation of the monitor fluxmeter 88. When the voltage component across the shunt 156 is greater than the standard reference voltage, the fluxmeter coil 129 rotates to throw more light on the phototube 143. More light on the phototube 143 increases the positive potential of grid 151 of tube 148 and causes this tube to conduct more current. The increase of current in the circuit of tube 148 tends to lower the average potential of terminal 83 and thereby the grid potential of amplifier tube 70 of the current regulator. As a result, through the action of the phase shifter 24 the excitation of the generator 1 is decreased in the manner heretofore explained and the current output of the generator is returned to the desired value as determined by an equilibrium condition between the voltage component of shunt 156 and the standard reference of the current standard section of the regulator.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric circuit to be controlled, means for controlling said circuit, means for providing an electric quantity having a constant value, means for comparing an electric quantity of said circuit with said electric quantity of constant value and for providing a controlling electric quantity variable in accordance with the difference between the electric quantity of constant value and the electric quantity of said electric circuit, control means responsive to said controlling electric quantity for controlling said first mentioned means, means for deriving a second electric quantity from said electric circuit, a standard of reference, means for comparing said second electric quantity with said standard of reference for providing a differential quantity variable in accordance with the departure of said second electric quantity from said standard of reference, and means responsive to said differential quantity for modifying the operation of said control means.

2. In combination, an electric circuit to be controlled, means for controlling said circuit, means for providing a component of voltage having a constant value, means for deriving a component of voltage from said electric circuit, means for comparing said components of voltage for providing a differential controlling component of voltage, control means responsive to said differential component of voltage for controlling said first mentioned means, means for deriving a second component of voltage corresponding to the current in said electric circuit, a standard of reference for providing a constant component of voltage, means for comparing said second component of voltage and the component of voltage from said standard of reference for providing a second differential controlling component of voltage variable in accordance with the current of said circuit, and means responsive to said second differential component of voltage for modifying the operation of said control means.

3. In combination, an electric circuit to be controlled, electronic regulating means responsive to the voltage of said electric circuit for controlling the voltage of said electric circuit, means independent of the current of said electric circuit for providing a current standard of reference, means for comparing the current value of said circuit with said current standard of reference to provide a differential electric quantity, and means for modifying the operation of said electronic regulating means in accordance with said differential electric quantity to maintain the current in said electric circuit at a value proportional to said current standard of reference.

4. In combination, an electric circuit to be controlled, electronic regulating means connected to be responsive to the voltage of said electric circuit for controlling the voltage thereof, means for providing a current standard of reference, means for comparing the value of current of said circuit with said current standard of reference to provide a differential electric quantity, and switching means for selectively connecting said voltage responsive means for energization in accordance with said differential quantity to change said regulating means from a voltage regulator to a current regulator.

5. In combination, an electric generator for energizing a variable resistance load, an excitation circuit for said generator, a voltage regulator connected to be responsive to the voltage of said generator for controlling said excitation circuit, means independent of the current of said generator for establishing a current standard of reference, means for comparing the current of said generator and said current standard of reference, and means for maintaining the current of said generator constant irrespective of variations in its load resistance comprising means for modifying the operation of said voltage regulator in accordance with the departure of the current of said generator from said current standard of reference.

6. In combination, a direct current generator having an output circuit for energizing a variable resistance load, an excitation circuit for said generator, means comprising a rectifier including a pair of electronic tubes for controlling the energization of said excitation circuit, means for controlling the output of said rectifier including a direct current winding, a source of regulated voltage, means including a control electronic tube having a control electrode and connected to be energized from said source of regulated voltage for controlling the energization of said direct current winding, means for obtaining a component of voltage variable in accordance with the difference between the voltage of said source and the voltage of said generator for controlling said control electronic tube, a current standard of reference, a current shunt in said output circuit, means for connecting said current standard of reference and said current shunt in differential relation for producing a differential component of voltage, and means for modifying the potential of the control grid of said control electronic tube in accordance with said differential component of voltage.

7. In combination, a direct current generator having an output circuit for energizing a variable resistance load, an excitation circuit for said generator, means comprising a rectifier including a pair of electronic tubes for controlling the energization of said excitation circuit, means for controlling the output of said rectifier including a direct current winding, a source of regulated voltage, means including a control electronic tube connected to be energized from said source of regulated voltage for controlling the energization of said direct current winding, said control electronic tube having an anode, a cathode and a control electrode, a voltage divider including a plurality of resistors connected in series relation across the output circuit of said generator and having an intermediate junction terminal connected to said control electrode, a current standard of reference, a current shunt in said generator output circuit, means for obtaining a differential component of voltage variable in accordance with the departure of the current of said shunt from said current standard, switching means for connecting said differential voltage to said voltage divider for modifying the voltage applied to said control electrode from said junction terminal, a glow discharge device for providing thereacross a constant component of voltage when energized, and switching means simultaneously operative with said first mentioned switching means for connecting said glow discharge device in the anode-cathode circuit of said control electronic device.

8. In combination, a source of constant voltage, a second source of voltage subject to variation connected in series differential relation with said source of constant voltage, means for controlling said second source of variable voltage including an electric winding connected to be energized in accordance with the differential component of voltage between said sources of voltage, energy storage means connected to said second source and responsive to a change in voltage of said second source for introducing a component of voltage in the circuit of said electric winding, and means responsive to the differential component of voltage between said sources of voltage for maintaining a state of equilibrium therebetween.

9. In combination, a source of constant voltage, a second source of voltage subject to variation connected in series differential relation with said source of constant voltage, means including an electric winding connected to be energized in accordance with the differential component of voltage between said sources of voltage, means for controlling said second source of voltage, means comprising a capacitor connected to be charged from said second source and connected in ciruit with said electric winding for introducing therein a component upon any change in voltage of said second source, and means responsive to the energization of said electric winding for controlling said second mentioned means to maintain equilibrium between said second source of voltage and said source of constant voltage.

10. In combination, an electric generator for energizing a variable resistance load, an excitation circuit for said generator, a voltage regulator connected to be responsive to the voltage of said generator for controlling said excitation circuit, a current standard of reference including an electric winding, means for maintaining the current of said generator constant irrespective of variations in its load resistance comprising means for modifying the operation of said voltage regulator in accordance with the departure of the current of said generator from said current standard of reference, and anti-hunting means comprising means responsive to a change in the voltage of said generator for introducing a component of voltage in the circuit of said electric winding.

11. In combination, an electric generator for energizing a variable resistance load, an excitation circuit for said generator, a voltage regulator connected to be responsive to the voltage of said generator for controlling said excitation circuit, a current standard of reference including an electric winding, means for maintaining the current of said generator constant irrespective of variations in its load resistance comprising means for modifying the operation of said voltage regulator in accordance with the departure of the current of said generator from said current standard of reference, and anti-hunting means comprising a capacitor connected to be responsive to a change in the voltage of said generator for introducing a component of voltage in the circuit of said electric winding.

JERRY L. STRATTON.

REFERENCES CITED

The following references are of record in the file of this patent:

UNITED STATES PATENTS

| Number | Name | Date |
| --- | --- | --- |
| 2,057,490 | Jenks | Oct. 13, 1936 |
| 2,074,947 | Stratton | Mar. 23, 1947 |

Certificate of Correction

November 2, 1948.

Patent No. 2,452,611.

JERRY L. STRATTON

It is hereby certified that errors appear in the printed specification of the above numbered patent requiring correction as follows:

Column 2, line 42, for "is is provided" read *is provided*; column 3, line 60, for the word "position" read *positive*; column 12, line 13, claim 9, after "component" insert *of voltage*;

and that the said Letters Patent should be read with these corrections therein that the same may conform to the record of the case in the Patent Office.

Signed and sealed this 24th day of May, A. D. 1949.

[SEAL]

THOMAS F. MURPHY,
*Assistant Commissioner of Patents.*